(12) United States Patent
Forke et al.

(10) Patent No.: US 12,441,607 B2
(45) Date of Patent: Oct. 14, 2025

(54) MICROMECHANICAL COMPONENT AND METHOD FOR PRODUCING SAME

(71) Applicants: Fraunhofer-Gesellschaft zur Förderung der angewandten Forschung e.V., Munich (DE); Technische Universität Chemnitz, Chemnitz (DE)

(72) Inventors: Roman Forke, Chemnitz (DE); Karla Hiller, Chemnitz (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 1011 days.

(21) Appl. No.: 17/256,565

(22) PCT Filed: Jun. 27, 2019

(86) PCT No.: PCT/EP2019/067248
§ 371 (c)(1),
(2) Date: Dec. 28, 2020

(87) PCT Pub. No.: WO2020/002554
PCT Pub. Date: Jan. 2, 2020

(65) Prior Publication Data
US 2021/0147223 A1    May 20, 2021

(30) Foreign Application Priority Data

Jun. 29, 2018   (DE) .................... 10 2018 210 810.2

(51) Int. Cl.
*B81C 1/00*       (2006.01)
*B81B 3/00*       (2006.01)
*G01P 15/125*     (2006.01)

(52) U.S. Cl.
CPC ........ *B81C 1/00619* (2013.01); *B81B 3/0027* (2013.01); *G01P 15/125* (2013.01);
(Continued)

(58) Field of Classification Search
CPC ..... B81B 3/007; B81B 3/0078; B81B 3/0051; B81B 3/0054; B81B 3/0056;
(Continued)

(56) References Cited

U.S. PATENT DOCUMENTS

| | | | |
|---|---|---|---|
| 6,528,724 B1 | 3/2003 | Yoshida et al. | |
| 2002/0158293 A1* | 10/2002 | Lee | G01C 19/5755 257/414 |

(Continued)

FOREIGN PATENT DOCUMENTS

| | | |
|---|---|---|
| CN | 102030307 A | 4/2011 |
| CN | 103373697 A | 10/2013 |
| CN | 104422436 A | 3/2015 |

OTHER PUBLICATIONS

International Search Report and Written Opinion received for PCT Patent Application No. PCT/EP2019/067248, mailed on Dec. 9, 2019, 15 pages (7 pages of English Translation and 8 pages of Original Document).

*Primary Examiner* — Jesse Y Miyoshi
(74) *Attorney, Agent, or Firm* — Faegre Drinker Biddle & Reath LLP

(57) ABSTRACT

A component for a micromechanical system has an upper side and a lower side disposed opposite the upper side and includes at least one first structural element that is arranged in a first region of the component and bounded by at least one first gap and at least one second structural element that is arranged in a second region of the component different from the first region and bounded by at least one second gap. The first region includes a first cutout in the lower side of the component, wherein a first thickness of the component in the (Continued)

first region is reduced in the second region with respect to a second thickness of the component. A minimal second gap width of the at least one second gap is larger than a minimal first gap width of the at least one first gap.

26 Claims, 6 Drawing Sheets

(52) U.S. Cl.
 CPC ............... *B81B 2201/0235* (2013.01); *B81B 2203/0163* (2013.01)

(58) Field of Classification Search
 CPC ............ B81B 3/0021; B81B 3/0013; B81B 2201/0228; B81B 2201/0235; B81B 2201/0242; B81B 2203/0163; B81B 2203/0315; B81B 2203/0307
 See application file for complete search history.

(56) References Cited

U.S. PATENT DOCUMENTS

| 2009/0140443 | A1* | 6/2009 | Hohlfeld ................. H02N 1/08 438/669 |
| 2011/0079081 | A1 | 4/2011 | Weiss et al. |
| 2011/0154905 | A1* | 6/2011 | Hsu ...................... G01L 9/0073 324/686 |
| 2013/0050290 | A1 | 2/2013 | Andersson et al. |
| 2013/0147313 | A1 | 6/2013 | Sachse |
| 2013/0285166 | A1 | 10/2013 | Classen |
| 2015/0053001 | A1 | 2/2015 | Frey et al. |
| 2016/0084872 | A1* | 3/2016 | Naumann ............... G01P 15/18 73/514.01 |
| 2016/0130137 | A1* | 5/2016 | Huang ................ B81C 1/00285 438/51 |
| 2016/0187370 | A1* | 6/2016 | Ikehashi ............ G01L 19/0618 73/514.32 |
| 2022/0155335 | A1* | 5/2022 | Tanaka ................. B81B 3/0043 |

* cited by examiner

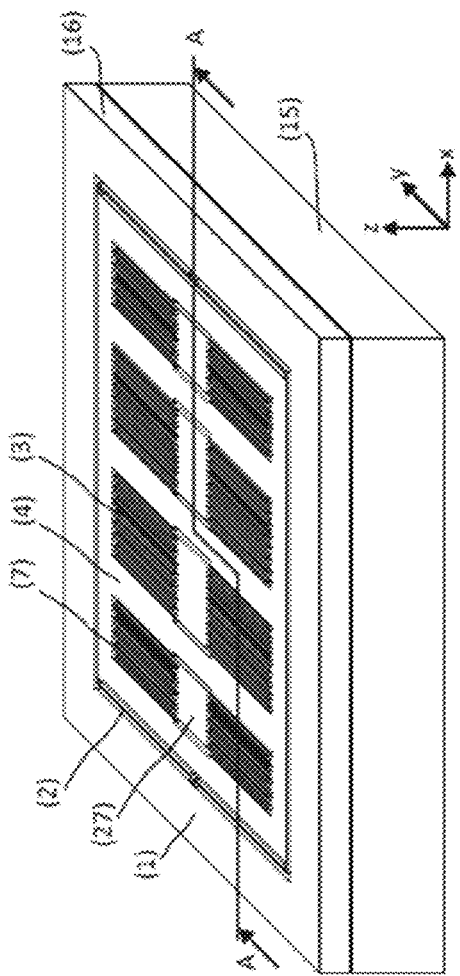
Fig. 2
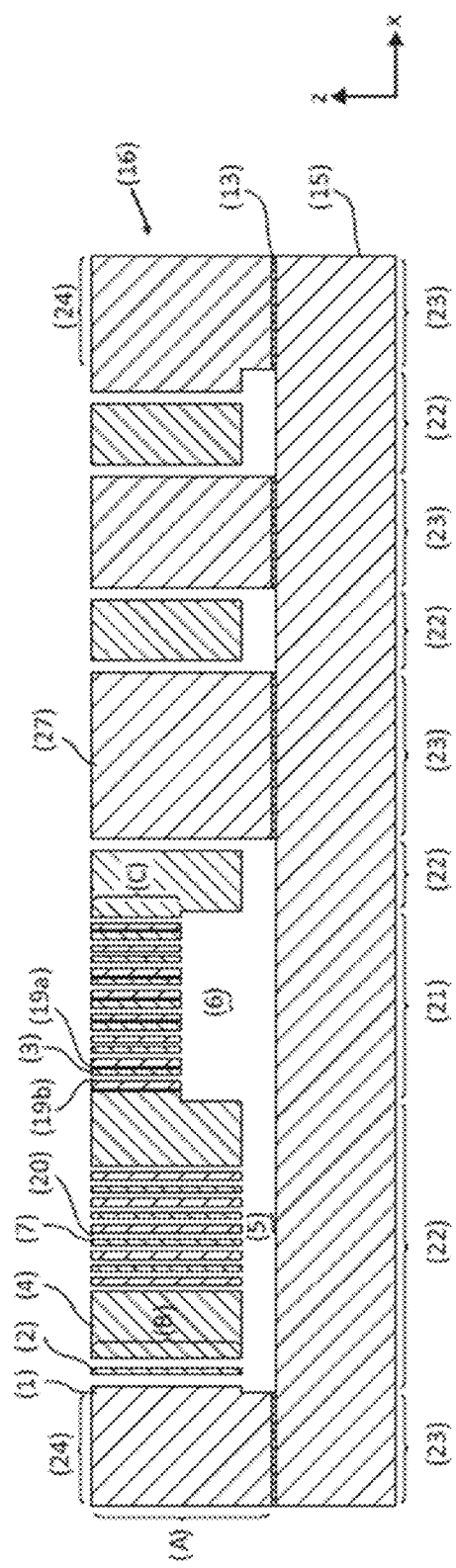
Section A-A:

ic component and to a method of producing same.

BACKGROUND

MEMS (microelectromechanical systems), for example movable spring-mass systems as sensors or actuators, are currently produced using different technological approaches while using silicon technology. The production typically takes place in batch processes on wafers. In the production of MEMS systems using an electrostatic or capacitive active principle, surface technologies or near-surface technologies (e.g. poly-Si layer over an $SiO_2$ sacrificial layer, SOI technology, cavity SOI technology, SCREAM technology, et al) currently predominate. It is common to these technologies that the micromechanical elements are structured from a silicon layer and a typical thickness between 10 μm and 75 μm by etching gaps by means of anisotropic dry etching.

The aspect ratio (ratio of gap depth to gap width) is an important criterion for the production of the structures. A high aspect ratio (HAR) of the gaps of the capacitive structures enables a high sensitivity for sensors and a better force coupling for actuators. A large structural height on the one hand enables a high aspect ratio with respect to the springs and thus a small cross-sensitivity (suppression of unwanted movement modes) and a large mass and so small noise on the other hand. Both a large structural height and an HAR are thus aimed at for highly sensitive MEMS.

The aspect ratio of the gaps achievable with an etching technique can, however, not be increased arbitrarily. It is limited by how fast the etching medium can enter into the narrow gaps and the reaction products can be transported away from them. The appearance of the aspect ratio dependent etching (ARDE) is therefore known, i.e. narrow gaps achieve a smaller etching depth than wider gaps in the same time. The reaction and the corresponding etching profile are influenced by a large number of parameters, inter alia also by the length of the gaps. Aspect ratios of the suppliers of foundry processes are typically in the range of 10:1 to 30:1 and typical gap widths achievable with etching techniques are in the range from 2 to 3 μm. A further increase in the aspect ratio is only possible with a considerable further development of the etching processes.

SUMMARY OF THE DISCLOSURE

It is an object of the disclosure to at least partially avoid the mentioned problems that result from the prior art and to propose a powerful component having a large aspect ratio and a fast and inexpensive method of producing such components. In this respect, for example, narrow gaps having a high aspect ratio should be able to be produced by etching and at the same time a high flexibility should be achieved in the structures to be produced with respect to structural height, structural width, and gap width.

The proposed component for a micromechanical system has an upper side and a lower side opposite the upper side. At least one first structural element that is bounded by at least one first gap is arranged in a first region of the component. At least one second structural element that is bounded by at least one second gap is furthermore arranged in a second region of the component that differs from the first region. The first region is defined by a first cutout in the lower side of the component. A first thickness of the component in the first region is reduced with respect to a second thickness of the component in the second region due to the cutout. The at least one first gap extends from the upper side to the lower side in the first region and ends in the first cutout. A gap depth of the first gap is thus defined by the first thickness of the component in the first region. In an analog manner, the at least one second gap in the second region extends from the upper side to the lower side and ends outside the first cutout. A second gap depth of the second gap is defined by the second thickness of the component in the second region and is thus larger than the first gap depth of the first gap. A minimal second gap width of the at least one second gap is larger than a minimal first gap width of the at least one first gap.

A coordinate system that can be associated with the component can be fixed such that the first and second thicknesses extend in the z direction and lateral dimensions of the component and gap widths and structural widths of the first and second structures extend in the x and/or y direction(s).

First electrodes whose sensitivity and performance are decisively determined in accordance with the principle of a capacitor by a surface of the structural elements that can represent electrode elements and whose distance from one another is determined can, for example, be provided by such a component in the first region by the first structural electrodes. The distance is given by the gap width in the condition of rest. A change of the gap width is made possible by a vibratory arrangement, which brings about a detectable change of the capacitance.

The second gaps for decoupling mutually vibratory sections of the component can be produced in the second region. Second structural elements, formed as springs, for example, that enable a vibration can be provided in the second region.

If a high sensitivity is desired for the electrodes in the first region, the etched gaps in the region should be kept as narrow as possible, while the area of the electrode elements or of the first structural elements that is given by the product of structural thickness and structural length (for example corresponding to a gap length) should simultaneously be maximized. With a fixed column length, a height aspect ratio (structural thickness to gap width) is therefore aimed for, for example, for the electrode elements in the first region.

Larger gap widths can in turn be desired in the second region to achieve a desired function of the spring elements or to enable deflections of a certain amplitude.

The initially mentioned effect of the aspect ratio dependent etching (ARDE) can represent a problem in connection with the different desired gap widths, in particular on the further reduction of the gap width to increase the capacitive sensitivity. This problem is avoided by the proposed component as will be described in the following.

With the proposed component, the thickness of the structure in the first region is reduced from the rear side by the cutout. This appears disadvantageous at first glance since the capacitive area of the electrodes and thus sensitivity is reduced with the thickness of the structure. It can, however, be shown that a reduction of the capacitive sensitivity accompanying the reduction of the structural thickness only influences it linearly while an increase in the capacitive sensitivity by a reduction of the gap width develops quadratically. This means that a reduction of the structural thickness can be compensated or overcompensated by a reduction of the gap width so that the sensitivity of the structure is increased despite the small structural thickness.

The inventors therefore propose such a design of the thickness variations and gap widths as well as a corresponding micromechanical structuring in which the ARDE effect is directly utilized to reduce the structural thickness in the region of the capacitive detection elements and thus to achieve very small gap intervals and an increase of the capacitive sensitivity, with even other, wider gaps as in the second region in the proposed component being introduced in the same component.

Since the at least one first gap that has a smaller gap width than the at least one second gap also has a smaller gap depth that the at least one second gap, it is achieved that the time required for etching the at least one first gap is reduced. Unlike with structures in which gaps of different depths are provided in a blank having a constant thickness, it can be achieved here that the etching processes for the narrower and the wider gaps can be carried out or ended at the same time or approximately at the same time.

With the proposed component, a maximum first aspect ratio of the at least one first gap can be defined by a ratio of the first gap depth of the minimal first gap width and correspondingly a maximum second aspect ratio of the second gap can be defined by a ratio of the second gap depth to the minimal second gap width. The maximum first aspect ratio in embodiments of the component can be equal to or substantially equal to the maximum second aspect ratio. The same or approximately the same etching time for the at least one first gap and the at least one second gap can thereby be achieved for the production method.

Substantially equal can here mean, for example, that a difference amounts to no more than 10%, preferably no more than 5%.

In embodiments, more than two regions of different thicknesses can also be present into which gaps are introduced, for example three or four regions of different thicknesses having gaps. These regions can be present in addition to a possible still thicker fastening or framework region that usually has gaps. The narrowest minimal gap widths can then be present, for example, in the region having the smallest thickness for the gaps localized there; the second narrowest minimal gap widths can be present in the region having the second smallest thickness, etc.

The at least one first structural element can be bounded at least at two oppositely disposed sides extending at least sectionally in parallel with one another by the at least one first gap. Alternatively or additionally, the at least one second structural element can be bounded at least at two oppositely disposed sides extending at least sectionally in parallel with one another by the at least one second gap. In such embodiments, the at least one first structure thus formed and the at least one second structure thus formed can be designed at least sectionally as a straight or curved plate.

Some of the first and second gaps can extend, for example, in the x direction and can be connected to one another by further, shorter first gaps that extend in the y direction. Two adjacent first or second gaps extending in the x direction are, for example, connected to one another by a first or second gap formed as a transverse gap extending in the y direction and introduced at the gap ends. For example, adjacent first or second gaps that extend in the x direction are connected to one another at alternating gap ends to provide a meandering structure.

The proposed component can comprise a frame and a mass arrangement vibratory with respect to the frame. The at least one second structural element can then comprise an elastic spring that connects the frame and the mass arrangement to one another such that they are vibratory relative to one another with a deformation of the spring. The frame and the mass arrangement can, however, also be completely separate from one another and can each be connected to a substrate, for example. The frame can then, for example, be fixedly connected to the substrate and the mass can be connected to the substrate by so-called anchors.

The frame and the mass arrangement can be moved with respect to one another by these different kinds of vibratory property, for example by acceleration of the component.

The proposed component can comprise one or more anchor structures. They can be fixedly arranged or fixedly arrangeable relative to the frame. For example, the anchor structure or anchor structures can be fastenable to a substrate, with the frame typically also being connectable to the substrate and being fastenable thereto so that the frame and the anchor structure are fixed with respect to one another. For this purpose, the anchor structures have the same thickness as the frame at least regionally and extend into the first and/or second region(s) in which electrodes are desired.

Some electrode elements of the structural elements formed as electrodes can then be fastened to the anchor structure, while other electrode elements or the remaining electrode elements of the structural elements formed as electrodes that should be movable with respect to those connected to the anchor structures are connected to those of the mass arrangement. The differently fastened electrode elements can thus vibrate with respect to one another so that the gap intervals between them vary. This can be achieved for the structural elements in the first region in that the at least one first gap extends between the mass arrangement and the frame or between the mass arrangement and the anchor structure. A section of the component that is disposed between the mass arrangement and the frame or anchor structure can then be decoupled by the gap into two mutually vibratory regions. The at least one first structural element bounded by the at least one first gap can then comprise first electrode elements of which at least one is connected to the frame or anchor structure and at least one further one is connected to the mass arrangement. These differently fastened electrode elements of the first electrodes can engage into one another and can be movable relative to one another. The above-mentioned change of the structural element intervals between first electrodes can be achieved by such an arrangement of the electrodes or of their electrode elements when the frame and the mass arrangement are moved with respect to one another.

If electrodes are likewise or alternatively desired in the second region, further anchor structures can, for example, be present or a different anchor structure can extend into the first and second regions. The second gaps then extend, analogously to the design described above in connection with the first gaps, in the second region between the anchor structure and the mass arrangement and separate differently fastened, mutually engaging electrode elements of the second electrodes from one another.

The at least one second structural element can comprise the second electrodes alternatively or additionally to the springs. The at least one second structural element can furthermore comprise, alternatively or additionally to the springs and/or the second electrodes, damper elements that can be designed like the second electrode elements and can, for example, have larger gap intervals than possible second electrodes.

The minimal structural width of the at least one first structural element can be smaller than a minimal structural width of the at least one second structural element.

A minimal gap width of the at least one first gap between the structural elements can amount, for example, to at least 0.1 µm, preferably at least 0.3 µm, and/or at most 3 µm, preferably at most 1.5 µm. Alternatively or additionally, a minimal gap width of the at least one second gap between the structural elements can, for example, amount to at least 0.5 µm and/or at most 4 µm.

The first thickness can, for example, amount to at least 5 µm. The first thickness can furthermore amount, for example, to at most 100 µm, preferably at most 60 µm. The first thickness can alternatively or additionally amount to at least 15%, preferably at least 25%, of the second thickness, but simultaneously, for example, at least 5 µm. The first thickness can also amount to at most 90%, preferably at most 80%, of the second thickness. The second thickness can, in an exemplary embodiment, therefore amount to 100 µm and the first thickness to between 25 µm and 80 µm.

The maximum first aspect ratio of the at least one first gap and/or the maximum aspect ratio of the at least one second gap can each, for example, be 10:1 or more, preferably 20:1 or more, particularly preferably 25:1 or more.

A height of the structural elements extends in the z direction and mostly results from the thickness of the component in that region in which the respective structural elements are located. The height of one or more of the at least one first structural element and/or of the at least one second structural element can be reduced, starting from the upper side and/or starting from the lower side, with respect to the thickness of the respective region in which it is located so that the height of a first structural element reduced in height in this manner does not correspond to the first height or thickness and/or the height of a second structural element reduced in height does not correspond to the second height or thickness. A sensitivity of electrodes in the first or second regions or a flexibility of springs can thus, for example, be influenced.

The proposed component can be produced, for example, from silicon, for instance monocrystalline silicon.

Lateral dimensions of the component that extend perpendicular to the thickness of the component can amount, for example, to between 0.5 mm and 15 mm. Lateral dimensions of the first cutout can amount, for example, to between 100 µm and 2000 µm. Lateral dimensions of the structural elements (springs, plates, dampers, masses) can amount, for example, to between 1 µm and 2000 µm.

In addition to the first cutout, a second cutout can be present in the component in the rear side of the component. The second region can then be defined by the second cutout, with the second thickness, that is consequently present in the region of the second cutout, being smaller than a third thickness of a third region different from the first and second regions. The third region is preferably encompassed by the frame and/or the anchor structure or anchor structures. This means that the frame and/or the anchor structures can have regions that have the third thickness, and thus the greatest thickness in comparison with the first region and the second region. The regions are suitable, for example, for fixing the component on the above-mentioned substrate.

A micromechanical system or MEMS to which this application likewise relates comprises the proposed component and the substrate for fastening the micromechanical component.

A component in such a micromechanical system can be fastened to a substrate formed as a base substrate, with the frame and/or the anchor structure or anchor structures of the component being connected to the base substrate at the lower side for fastening the micromechanical component. If a second cutout is present, the third region, that is all the sections in which the component has the third thickness, is, for example, connected to the base substrate. If no second cutout is provided, sections of the second region having the base substrate that represent frames and/or anchor structures can, for example, be connected to the base substrate. It can be advantageous in this case if the base substrate has a cavity to ensure a movability of the movable structures such as the mass arrangement or electrodes of the component and to prevent any contact of these structures with the base substrate.

The component can furthermore be covered at the upper side by a substrate configured as a top substrate. The top substrate mostly has a cavity to ensure the movability of the movable structures such as the mass arrangement or electrodes of the components and to prevent any contact of these structures with the top substrate. This may be necessary since usually no cutout that could have this effect is provided at the upper side of the component.

In the system, the substrate can, for example, be produced from silicon, preferably from monocrystalline silicon, and/or from a glass material or a ceramic material. If the substrate is produced from a glass material or a ceramic material, they can be thermally adapted to silicon to, for example, avoid thermally produced tensions in the component.

The application further relates to a method of producing a micromechanical component. The method is in particular suitable for the production of the above-described micromechanical component.

The method comprises specific steps that do not necessarily have to be carried out in the order shown here, but can rather also be carried out in reverse order or simultaneously in some cases.

In a step of the method, a first cutout is introduced into a lower side of a blank so that the blank has a first thickness extending in a z direction in a first region defined by the first cutout that is smaller than a second thickness extending in the z direction in a second region different from the first region.

A first gap is etched into the first region to establish at least one first structural element bounded by the at least one first gap. A second gap is etched in the second region to establish at least one second structural element bounded by the at least one second gap there. The etching of the at least one first gap and of the at least one second gap can in particular take place simultaneously. The etching respectively takes place along the z direction so that the at least one first gap has a first gap depth defined by the first thickness that is smaller than a second gap depth of the at least one second gap defined by the second thickness in the second region. A minimal first gap width of the at least one first gap, orthogonal to the z direction, is furthermore smaller than a minimal second gap width of the at least one second gap.

Since the at least one first gap that has a smaller gap width than the at least one second gap also has a smaller gap depth that the at least one second gap, it is achieved that the time required for etching the at least one first gap is reduced.

The at least one first gap and the at least one second gap can be etched simultaneously.

Unlike with structures in which gaps of different widths and depths are provided in a blank having a constant thickness, it can be achieved here that the etching processes for the narrower and the wider gaps can be ended at the same time or approximately at the same time. The reason for this can be found in the aspect ratio dependent etching, whereby an etching process takes place more slowly with narrower gaps in comparison with wider gaps.

In the method presented here, the etching of the at least one first gap and of the at least one second gap can, as mentioned, preferably take place simultaneously. The aim here can be to start the respective etching processes simultaneously and to end them simultaneously or approximately simultaneously. For this purpose, the at least one first gap and the at least one second gap can be predefined by a single mask (without additional adjustment tolerances) and are etched in a single step. The production time can be optimized by such as single-stage etching process. The problem results in methods in accordance with the prior art that wider gaps penetrate down to the lower side prematurely in comparison with narrower gaps, which can produce damage to the gap or to material disposed thereunder. This kind of damage is avoided by the embodiments shown here and a single-stage etching process is in particular also enabled with varying gap widths.

The at least one first gap and the at least one second gap can be etched from an upper side remote from the lower side starting in the z direction toward the lower side. This means that the gaps are then etched from the typically smooth upper side toward the lower side having the first cutout so that the first gaps end within the first cutout.

In a step of the method, a mask, preferably a lacquer mask and/or a hard mask, can be applied to the upper side of the blank. Geometrical dimensions in a plane perpendicular to the z direction can be predefined by the mask for the at least one first gap and the at least one second gap. The first and second gap widths and the first and second structural widths are therefore predefined in the x and y directions, for example.

The etching of the gaps can be carried out in a dry etching process; for example when the blank into which the gaps are etched consists of silicon or monocrystalline silicon or comprises silicon or monocrystalline silicon.

In the proposed method, a step can be provided for introducing a second cutout that takes place, for example, before the step for introducing the first cutout. The second cutout is, like the first cutout, introduced into the lower side of the blank, preferably by etching. In some embodiments, the first cutout is etched into the lower side and then the first cutout is etched within the second cutout to still further reduce the thickness there so that the cutouts are nested into one another and the first region that is defined by the first cutout is surrounded by the second region that can be defined by the second cutout. A third region that has the largest thickness of the three regions is then additionally definable outside the second cutout.

In the methods presented, in a step disposed downstream of the introduction of the first cutout or in a step disposed downstream of the introduction of the first cutout and the second cutout, a protective layer, formed as an oxide layer, for example, can be at least regionally applied to the lower side of the blank. It then therefore, for example, lines the first cutout and the possible second cutout. The regions can in particular be lined or covered by the protective layer in which the first and/or second gaps end.

In possible steps of the method, a height of one or more of the first and/or second structural elements, that is one or more of the first and/or second electrode elements and/or one or more of the springs, can be reduced starting from the upper side and/or starting from the lower side. This can, for example, take place in an etching process while using a mask or in some cases while using a multi-stage, for example a two-stage, mask having a plurality of mask layers. A two-stage mask can, for example, comprise a hard mask layer and a lacquer mask layer.

The reduction of the height of one or more of the electrode elements starting from the lower side can take place simultaneously with the introduction of the first cavity with the aid of a mask arranged at the lower side of the blank or component.

The reduction of the height of one or more of the electrode elements starting from the upper side can take place while using a two-stage mask. The two-stage mask can comprise a hard mask layer and a lacquer mask layer arranged above it, for example. In a first step or part step, the gaps predefined by the upper mask layer, that is typically by the lacquer mask layer, can be completely etched or also only pre-etched, that is, for example, pre-etched by a predefined depth. The upper mask layer can then be removed so that the lower mask layer remains that releases additional regions of the upper side of the component in comparison with the upper mask layer. The gaps can then be fully etched in a further step or part step, to the extent they had not been completely etched in the first step, while the additionally released regions are etched by a certain amount, whereby the desired reduction of the height of the structural elements can be achieved from the upper side.

The proposed method can comprise a step in which the blank is connected to the substrate. It can, for example, be arranged and thus fastened on a base substrate. Provision can, for example, be made that the blank having the first cutout and the possible second cutout—if a protective layer is provided, after the application of the protective layer to the lower side of the blank—is fastened on the base substrate before the first and second gaps are introduced. The blank is thus kept stable by the base substrate during the etching. It is also possible in this process that the blank having the first and second cutouts has an even greater thickness than the ultimately desired first and second thicknesses, and possibly the third thickness, to be more stable. A blank thicker in this sense can be handled and fastened to the base substrate more easily. After the fastening of the blank to the base substrate, a reduction of the thickness can then be carried out starting from the upper side so that the ultimately desired thicknesses are adopted in the first and second regions and in the possible third region. The gaps can be introduced afterward. This is in particular of advantage when particularly small thicknesses are desired; for example, a first thickness of 5 µm or of a little more than 5 µm.

The blank arranged on the base substrate having the first and second gaps or the component can then be covered by a top substrate. Contact regions of the blank provided by etching, preferably a frame and/or an anchor structure can be connected to the base substrate and/or top substrate. This can take place by wafer bonding, for example.

An insulation layer can be arranged in at least one of the contact regions of the micromechanical component having the base substrate and/or the top substrate. It is alternatively or additionally possible to introduce a cavity into the first and/or second substrates outside the contact regions on a side of the base substrate and/or top substrate facing the micromechanical component before the fastening. It can thus be achieved that, for example, the second region does not have any unwanted contact with the substrate and remains freely movable. This can in particular be of advantage with the substrate formed as the base substrate if there is no second cutout at the lower side of the component connected to the base substrate. The cavity can furthermore in particular be of advantage with the substrate formed as the top substrate to avoid the upper side of the component having contact with the top substrate at unwanted points and thus being prevented from vibrating.

In the method presented here, the first and second cutouts can, for example, be nested concentrically in one another. The first and/or second cutouts can furthermore be arranged centrally at the lower side formed as a rectangle, for example. The first and second gaps should now end in the regions defined by the first cutout or where applicable by the second cutout, as described above. They should therefore be etched at corresponding points at the upper side.

An additional advantage of the method can be found in a permitted tolerance that can be given with respect to the cutouts with respect to the positioning of the cutouts with respect to the component and/or a tolerance of the position of the mask that predefines the position of the gaps. The region defined by the first cutout can thus be 10 μm to 200 μm larger, for example, in the x and/or y directions than a region of the mask in which the first gaps are predefined. The mask thus does not have to be positioned nm-exactly centrally above the first cutout to achieve the desired function. An additional simplification of the production process can thereby be achieved that helps to lower costs or to automate the production process. The region of the mask that predefines the at least one second gap is typically selected such that the at least one second gap is arranged sufficiently far away from the first gaps to ensure that the at least one second gap is introduced in the second region. The position of steps between the first and second or second and third regions can admittedly be varied by a displacement of the position of the mask with respect to the cutouts, but this position change is tolerable in the range of the adjustment precision achievable by means of photolithography.

It must be emphasized that features that were only described in connection with the component can also be claimed for the method shown and vice versa.

BRIEF DESCRIPTION OF THE DRAWINGS

Exemplary embodiments of the disclosure are shown in the Figures. There are shown:

FIG. 2 a perspective view and a sectional view of a proposed component, in accordance with embodiments of the subject matter of the disclosure;

DETAILED DESCRIPTION

Figure 1:
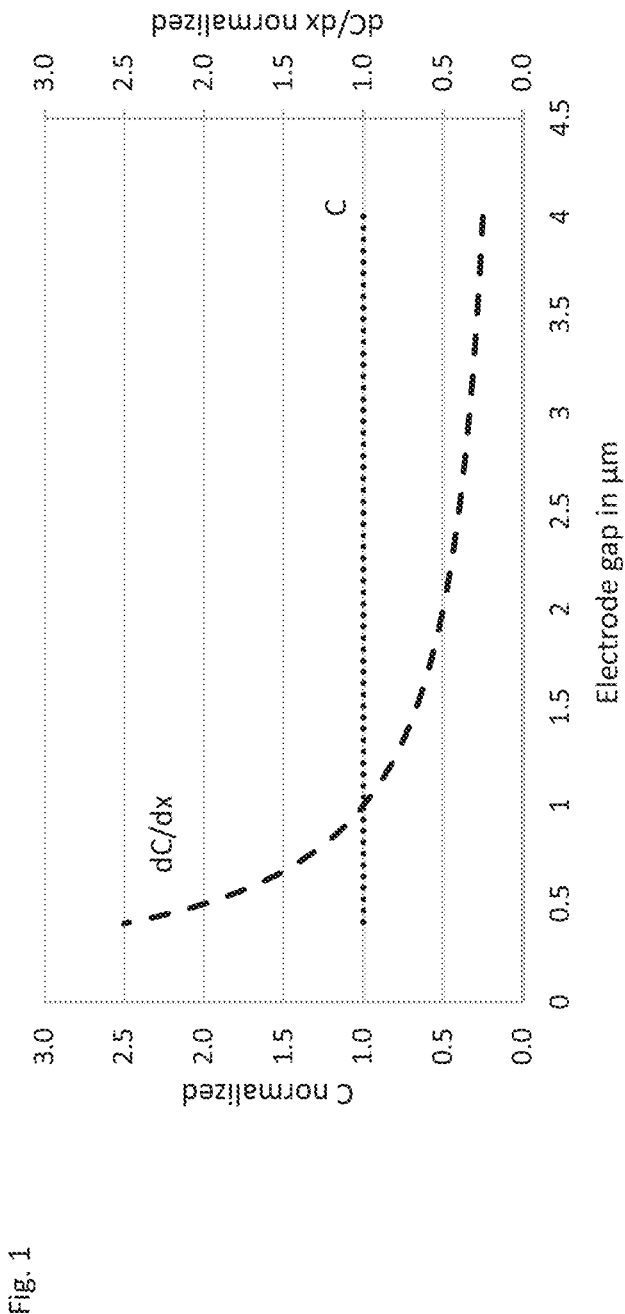
FIG. 1 a plot of the normalized capacity and of the normalized capacitive sensitivity of electrodes, applied over the width of an electrode gap, in accordance with embodiments of the subject matter of the disclosure.
Figure 3:
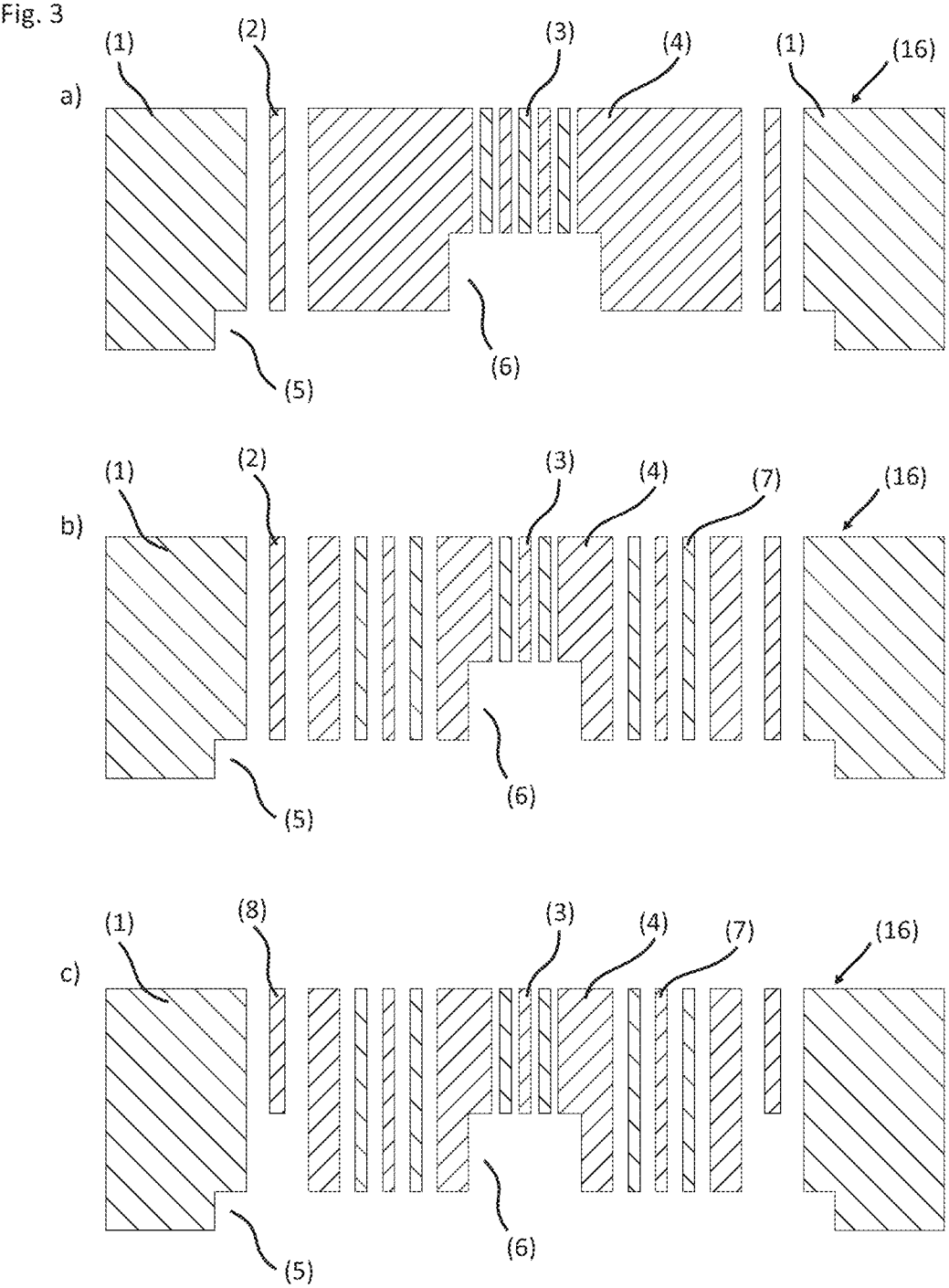
FIGS. 3a-c different embodiments of the proposed component, in accordance with embodiments of the subject matter of the disclosure.
Figure 4:
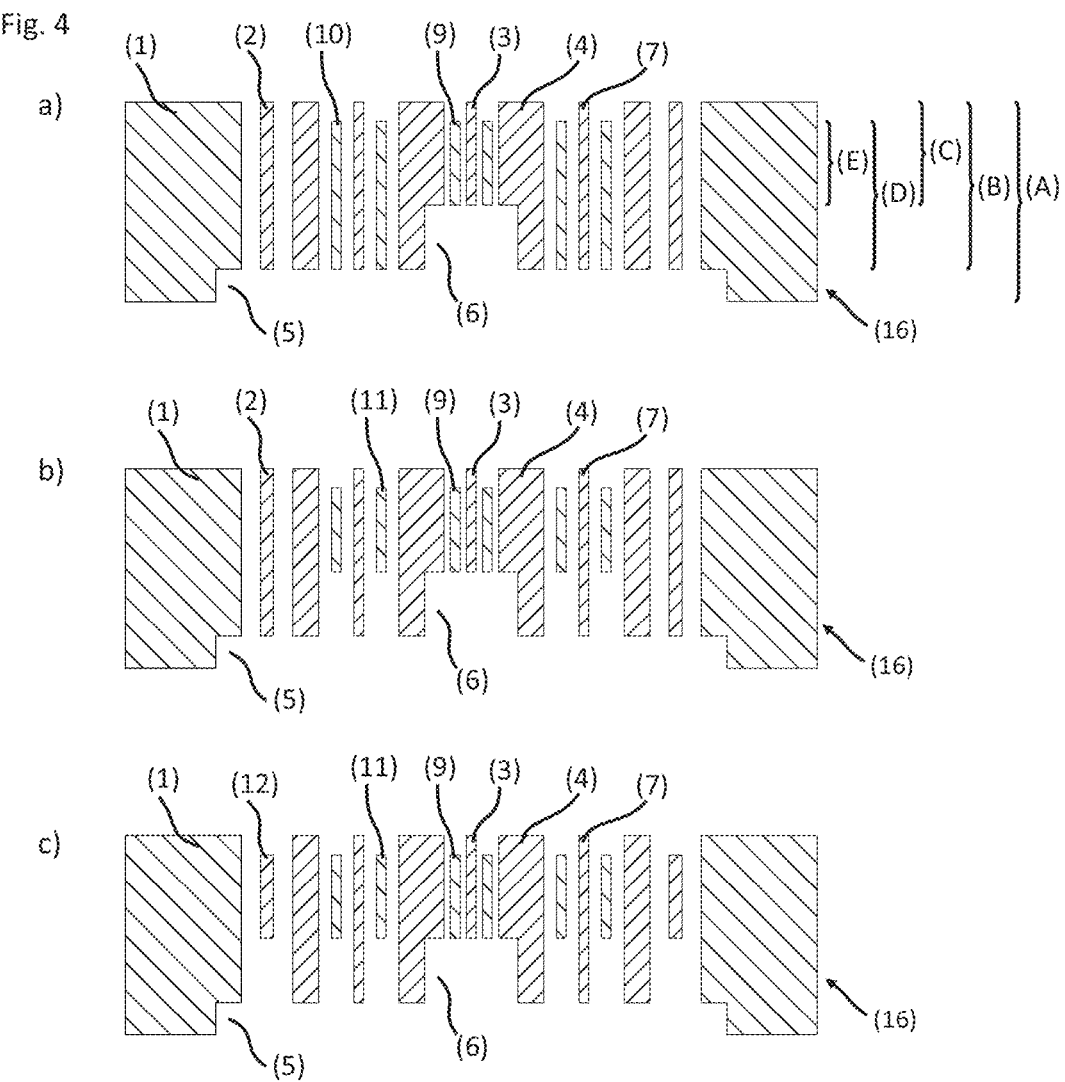
FIGS. 4a-c different embodiments of the proposed component with additional front side machining, in accordance with embodiments of the subject matter of the disclosure.

FIG. 1 shows a plot in which a normalized capacitance C (C normalized, dotted line) and a normalized capacitive sensitivity dC/dx, that is a change of the capacitance on a variation of the gap width×(dC/dx normalized, dashed line) are entered above an electrode gap width×(electrode gap in μm). In accordance with the principle of a plate capacitor, the capacitance C results from the quotient of an area A of the electrodes over their spacing, that is the electrode gap width: $C \propto A/x$. With a constant electrode area, the capacitance therefore behaves inversely proportionally to the electrode gap width x. In the Figure, the capacitance C is entered normalized to 1 for electrode gaps of between 0.5 μm to 4 μm; the inverse proportional behavior was therefore eliminated (by multiplication by x). On an increase or decrease of the area A, the normalized capacitance is varied accordingly in accordance with $C \propto A/x$ proportionally to the area.

The capacitive sensitivity dC/dx is thus proportional to $A/(x^2)$. It is in turn applied normalized (by multiplication by x) for electrode gaps of 0.5 μm to 4 μm and accordingly shows an inverse proportionality to the electrode gap. The capacitive sensitivity dC/dx therefore increases much more strongly for small gap distances than the capacitance C itself. The area A only enters linearly into both the capacitance and the capacitive sensitivity. An improvement of the ratio of capacitive sensitivity to the base capacitance is above all of high interest for energy saving systems. The reduction of the basic capacitance effects a reduction of the power consumption for the subsequent capacitance to voltage converter circuit. The ratio of capacitive sensitivity and basic capacitance is significantly improved in the range of small distances, as is shown in FIG. 1. The influence of the electrode spacings x on the capacitive sensitivity can accordingly be considerably stronger than the influence of the electrode areas A.

FIG. 2 shows a micromechanical system (MEMS) in an oblique view and in a sectional view along the line A-A drawn in the oblique view.

A component 16 is arranged on a base substrate 15 in the system, with an upper side of the component 16 being able to be seen in the oblique view and with a plurality of gaps 19, 20 being introduced into said upper side that extend from the upper side up to a lower side disposed opposite the upper side.

The component 16 and the base substrate 15 on which it is arranged are produced from monocrystalline silicon.

Lateral dimensions of the component, in the x direction and in the z direction, perpendicular to a thickness extending in the z direction, amount to between 0.5 mm and 15 mm.

The component 16 comprises first structural elements 3 that form a plurality of electrodes 3 and that are arranged in a first region 21 of the component 16 and are bounded by at least one first gap 19. The component furthermore comprises a plurality of second structural elements 2, 7 of which some form electrodes or dampers 7, others form springs 2 and which are arranged in a second region 22 of the component different from the first region 21. The second structural elements 2, 7 are bounded by second gaps 20.

As can be recognized in the sectional view A-A, the first region 21 is defined by a first cutout 6 that is introduced into the lower side of the component. The component has a first thickness C in the first region 21. This first thickness C of the component in the first region 21 is reduced with respect to a second thickness B of the component in the second region 22. The first gaps 19 extend from the upper side to the lower side in the first region 21 and end in the first cutout 6. The first gap depth of the first gaps 19, as also the height of the first structural elements 3, is thus defined by the first thickness C. The first gaps 19 in the example shown comprise first gaps of different widths: narrower first gaps 19a and wider first gaps 19b are arranged in the first region 21. Lateral dimensions of the first cutout 6 in the x direction and in they direction amount to between 100 µm and 2000 µm. The first thickness C in the z direction amounts to between 5 µm and 60 µm. The first thickness that is reduced with respect to the second thickness by the first cutout 6 amounts to between 25% and 80% of the first thickness.

The second gaps 20 extend from the upper side to the lower side in the second region 22 and end outside the first cutout 6. Their gap depth and the height of the second structural elements 2, 7 therefore corresponds to the second thickness B of the component in the second region 22. The second gap depth is therefore greater than the first gap depth.

A minimal second gap width of the second gaps is here larger than a minimal first gap width of the first gaps. In the present case, there are gaps of different widths in the first region 21 that can all be defined as first gaps. The gap width of the narrower ones 19a of these first gaps 19 represents the minimal first gap width that is smaller than the gap width of the second gaps 20 having the smallest width. The gap width of the wider first gaps 19b can be selected as smaller, of equal size to, or as larger than the minimal second gap width. It is also possible that individual gaps have a width that varies along its length; the minimal value of this varying width can then be defined as a minimal gap width.

A maximum first aspect ratio of the first gap 19 is given by a ratio of the first gap depth to the minimal first gap width and a maximum second aspect ratio of the second gap 20 by a ratio of the second gap depth to the minimal second gap width. The maximum first aspect ratio and the maximum second aspect ratio are of equal size in the embodiments shown. The maximum aspect ratio of the first gaps and the maximum aspect ratio of the second gaps are each larger than 25:1.

The first structural elements 3 and the second structural elements 2, 7 of the component are formed as plates and are bounded by the first gaps 19 and second gaps 20 at two oppositely disposed sides formed in parallel with one another. At least some of the first 3 and second 7 structural elements formed as electrode elements are each bounded by a further first 19 and second 20 gap that extends orthogonally to the first 19 and second 20 gaps bounding the parallel sides so that the respective structural elements 3, 7 are connected to the remaining component at a remaining fourth side.

The component comprises a frame 1 and a mass arrangement 4 vibratory with respect to the frame 1. The frame 1 and the mass arrangement 4 are connected to one another in a vibratory manner by the spring 2, that is they can vibrate relative to one another under deformation of the spring 2. The vibratory property is given in one, two, or three spatial directions.

As mentioned, the first gaps 19 at least bound some of the first structural elements 3 such that three of their sides are exposed and a fourth is connected to the remaining component. This is implemented in the embodiments shown such that some of the first structural elements 3 are connected to the mass arrangement 4 and other ones to the frame 1 or to an anchor structure 27 fixedly arranged or fixedly arrangeable relative to the frame. The electrode elements of the electrodes separated from one another by the first gaps or the first gap and connected to different sections or elements of the component are arranged engaging into one another or meshed with one another. They therefore overlap sectionally so that the overlapping regions represent electrodes of a capacitor. When the mass arrangement 4 vibrates with respect to the frame 1 or the anchor structure 27, the electrode elements connected to the respective sections or components vibrate along accordingly. The gap intervals between adjacent electrode elements and/or the overlapping area of two adjacent electrode elements vary due to the vibration, which brings about a measurable change of the capacitance of the capacitor structure formed by the electrodes 3.

Like the first electrode elements of first electrodes 3 formed by the first structural elements, the second electrode elements of second electrodes 7 formed by second structural elements can be separated from one another by the second gap 20 extending between them or by the second gaps 20 extending between them, with some of the second electrode elements being connected to the mass arrangement 4 and other ones to the frame 1 or to an anchor structure 27 fixedly arranged or fixedly arrangeable relative to the frame 1. The second electrode elements connected to the mass arrangement 4 can accordingly vibrate with respect to the second electrode element connected to the frame 1 or to the anchor structure 27 and with respect to which they are arranged engaging into one another.

The component can also comprise second structural elements 7 that are formed as a damper element 7 and whose design is similar to the design of the second electrodes 7, but that differ from them in their structure.

The first structural elements 3 have a structural width that extends between the two first gaps 19 extending in parallel, with a minimal structural width of the first and second structural elements amounting, for example, to between 1 µm and 10 µm. The minimal first gap width in the first region amounts to between 0.3 µm and 1.5 µm and the minimal second gap width is larger than the minimal first gap width and amounts to between 1.5 µm and 4 µm.

The component also comprises, in addition to the first region 21 having the first thickness C and the second region 22 having the second thickness B, third regions 23 having a third thickness A. The third thickness A is even larger than the second thickness B. The second region 22 is defined by a second cutout 5 in the rear side of the micromechanical component by which the thickness is reduced with respect to the third region A and by which the second region 22 is thus shaped. The first cutout 6 is in turn introduced within the second region 22 to form the first region 21. The third region 23 is that region in which the frame 1 and the anchor structure 27 or the anchor structures 27 predominantly extend. Parts of the frame 1 are formally also disposed in the second region 22 since they have the second thickness B. The third region A is thus encompassed by the frame 1 and the anchor structures 27.

The third regions 23 having the base substrate 15 are connected to the base substrate at the lower side to fasten the component to the base substrate. The frame and/or the anchor structure 27 of the component is/are connected to the substrate at the upper side and/or at the lower side. An insulation layer 13 is located in the fastening region between the component and the substrate 15.

As mentioned, the component and the substrate 15 are composed of monocrystalline silicon. The component can, for example, also be produced from an electrically insulating glass material or ceramic material, with the glass material or the ceramic material being thermally adapted to silicon. The insulation layer 13 can be omitted in this case.

The object of providing a component having a high performance and (capacitive) gap intervals that are as small as possible is achieved with the component shown in that regions 21, 22, 23 having different structural thicknesses are produced within the component. The functional elements 2, 3, 7 in the MEMS are bounded in accordance with their functions by gaps 19, 20 of different widths and are associated with these regions 21, 22, 23 such that the maximum aspect ratio technically possible by etching can be respectively used in the best possible manner. The capacitive sensitivity and the seismic mass as well as the cross-stiffness can thereby be increased independently of one another. While maintaining the maximum possible aspect ratios that can be technically implemented by etching, the structural thickness is lowered in the first region 21 in which the electrodes 3 having the highest sensitivity are located. The first gaps 19 formed as electrode gaps can hereby be implemented with dimensions <1 μm in this region.

In the same process, the structural thickness in the region of the mass elements 4 and of the spring 2 can be designed as substantially larger. Structures having a large seismic mass can thereby be provided, which brings about an increase of the signal-to-noise ratio (SNR) and/or having cross-stiffnesses, whereby unwanted movements can be suppressed. These two aspects are above all necessary and advantageous for the design of highly precise micromechanical inertial sensors; however, the basic principle can be transferred to further sensor and actuator functions.

Embodiments of the disclosure are explained in FIG. 2 for the example of a one-dimensional MEMS structure, for example forming an acceleration sensor. The technology presented is, however, not restricted to such systems. Some further possible embodiments are shown in the further FIGS. 3 to 9, with by no means an exclusive list being included therein.

The MEMS structures are preferably produced from a monocrystalline silicon substrate and consist of a peripheral frame having the third thickness A, a mass element 4 (seismic mass), and at least one suitable spring 2 or spring arrangement having the second thickness B. The second structural elements 7 such as plate-shaped elements for electrostatic force coupling, can be designed for capacitive detection or for setting the damping with this second thickness B. This is shown by way of example for damping elements 7 in FIG. 2. The second structural elements 7 in this second region 22 having the second thickness B are bounded by the second gaps 20 having a second minimal width. First regions 21 having a further reduced first structural thickness C are furthermore produced with which further first structural elements 3 can be associated such as additional spring arrangements, regions of inertial masses, plate-shaped elements for electrostatic force coupling, for capacitive detection, and for setting the damping. Detection electrodes 3 having the reduced first thickness C are shown by way of example for this purpose in FIG. 2. The first gaps 19 bounding them and having a minimal first width are significantly smaller than the second gaps 20. The respective maximum aspect ratio in both regions that results from the ratio of the respective minimal gap width and the associated structural thickness present in the respective region is selected such that it is approximately the same and agrees with the aspect ratio that can be implemented by technical etching.

In an exemplary possible adaptation of the gap intervals and associated structural thicknesses under the assumption of a maximum aspect ratio of 25:1, smallest gap widths of 2 μm in the second region 22 having a structural thickness of 50 μm, and smallest gap widths of 1 μm in the first region 21 having a structural thickness of 25 μm are implemented, for example. A doubling of the capacitive sensitivity is thus already achieved in this example.

The performance of this principle of approximation of the maximum aspect ratio by a suitable association of gap widths and structural thicknesses is shown in FIG. 2 for the example of the additionally lowered first region 21; however, it is not restricted to only one gradation.

The described MEMS structure is fastened in the third regions 23 having the third thickness A on a lower substrate that consists or an electrically insulating material or is coated with an electrically insulating material 13 such as SiO$_2$. Fastening regions 24 to a possible upper substrate (see FIGS. 6 to 9) are produced at the upper side of the component in the third region 23.

The production of the component or MEMS shown in FIG. 2 or in one of the following Figures takes place by etching, for example by dry etching.

In the case of the component shown in FIG. 2, the second cutout 5 is first introduced into the lower side of a blank so that the blank has a reduced thickness where the second cutout 5 extends. The first cutout 6 is then introduced within the second cutout 5 to reduce the thickness even further. This means that the three disjunctive regions 21, 22, 23 having thicknesses different from one another are present after the introduction of both cutouts 5, 6. The three different thicknesses can be the thicknesses, C, B, A, but they can also be three thicknesses that are each larger by a specific value than the thicknesses C, B, A, with the thickness of the blank being reduced starting from the upper side in a later step so that the thicknesses C, B, A are adopted.

The first gaps 19 are each etched in the first region 21 and simultaneously the second gaps 20 in the second region 22, in each case in the z direction starting from the upper side. This is preferably done after the blank or the component 16 has been arranged on the base substrate 15. A mask is provided for the etching at the upper side of the blank that predefines the position, extent, and width of all the gaps. The mask, which is, for example, a lacquer mask or a hard mark, therefore predefines the geometrical dimensions of the first 19 and second 20 gaps in the x-y plane perpendicular to the z direction or etching direction.

The mask is formed and is positioned on the upper side such that the narrowest gaps are in the first region and wider gaps that, for example, bound dampers 7 or springs 2 are disposed in the second region 22. The position of the cutouts is therefore taken into account in the positioning of the mask. Tolerances can be provided, for example, in that the first 6 and/or the second 5 cutout is/are generously dimensioned such that the positioning of the mask can take place, for example, in the x direction and/or in the y direction to exactly e.g. 5 to 10 µm. All the gaps 19, 20 are then simultaneously etched in one step starting from the upper side in the z direction toward the lower side until they have fully penetrated the blank and emerge at the lower side.

The blank or the component 16 is, as mentioned, typically arranged on the base substrate 15 before the introduction of the gaps 19, 20 and are connected thereto by wafer bonding. The connection is established to the third thickness A in the third region 23, that is between the frame 1 and the substrate 15 or between the anchor structures 27 and the base substrate 15.

FIGS. 3*a*-*c* are restricted to the representation of the MEMS functional layer, that is of the component without substrate, in different embodiments. The first cutout 6 and the second cutout 5 are present in all the embodiments shown there.

In FIG. 3*a*, electrodes 3 having high sensitivity are provided in the first region and only springs 2 in the second region. The mass elements 4 are located between the electrodes 3 and the springs 2. A larger section of the mass elements 4 extends in each case in the second region 22 and has the second thickness B; however, a smaller section of the mass elements 4 projects in each case into the first region 21 and has the first thickness C.

Dampers 7 are arranged beside the springs 2 in the second region 22 in FIG. 3*b*. The vibration behavior is thus different than in the example of FIG. 3*a*. Embodiments shown in FIG. 3*c* whose structure is similar to the embodiments of FIG. 3*b* in which structural elements formed as springs 8 and having a reduced height or thickness from the lower side in the z direction are present in the second region 22. The thickness of the component has here been reduced from the rear side in the second region 22, where the springs 2, 8 are provided. This can in particular take place simultaneously with the introduction of the first cutout 6 by etching with the aid of a corresponding mask arranged at the lower side of the blank. The first cutout 6 and the recesses for reducing the height of the springs 8 can then be etched simultaneously. The springs 8 thereby typically have the same height or thickness that is also present in the first region 21, as also shown in the Figure.

FIGS. 4*a*-*c* show embodiments in which the respective height of some of the first and/or structural elements has been reduced by etching from the upper side. In FIG. 4*a*, lowered ones from the upper side are shown as electrode elements 9 in the first region 21 that then have a fifth thickness or height E and damper elements 10 lowered from the upper side are shown in the second region 22 that have a fourth height D. The springs 2 in the embodiments shown have their full height that corresponds to the second thickness B.

In FIG. 4*b*, in contrast to FIG. 4*a*, dampers 11 are reduced from both sides in the second region, that is from the upper side and from the lower side. These dampers 11 reduced at both sides then also have the fifth height E. In FIG. 4*c*, in contrast to FIGS. 4*a* and *b*, the springs are also height reduced at both sides and have the fifth height E.

The gradation of the structural elements 9, 10, 11, 12 from the upper side likewise takes place by etching, with a two-stage mask, for example comprising a hard mask and a lacquer mask, being applied to the upper side. The etching of the gaps 19, 20 and the height reduction of the structural elements 9, 10, 11, 12 can then take place in a two-stage etching process.

In summary, the following structural elements can therefore be produced by the additional height reduction, for example (cf. FIG. 3*c*, FIGS. 4*a*-*c*):
   spring 8 graded from below;
   electrode elements of very high sensitivity 9 graded from above;
   damper elements or electrode elements 10 graded from above;
   damper elements or electrode elements 11 graded at both sides;
   springs 12 graded at both sides.

These structural elements 8, 9, 19, 11, 12 can thus be ideally adapted to their respective functions. Springs 8, 12 graded at one side or at both sides thus enable a facilitated dimensioning of vertical movement forms. They can, for example, advantageously be electrostatically excited or capacitively detected with the aid of electrodes 9 graded at the side or at both sides. MEMS elements can thereby be advantageously combined and integrated in a substrate for multiaxial sensors or actuators.

The lowering of the structural thickness in the region of the electrodes 3 having increased sensitivity is achieved with an additional etching step in the described technology. The thickness relationships are designed such that the ARDE is directly used between structures having a greater gap width and the structures having the smallest gap intervals. In this respect, the gap lengths are also directly adapted; very long, narrow gaps are optionally interrupted by direct introduction of expansions in that therefore the gap width is e.g. locally increased. The definition of the lateral structural dimensions of all the functional elements thus takes place in an etching step, whereby a best possible structural faithfulness is achieved.

To achieve the additional lowering of some functional elements (e.g. springs, fixed position or movable capacitive electrodes) shown in FIGS. 4*a*-*c*, a two-stage structuring processes (preferably a two-stage etching process) of the upper side of the blank can be used. A combination of two prestructured mask layers can be used for this purpose. After a pre-etching step with a defined depth, the upper mask layer is removed and the etching is continued so that the desired height gradation is adopted. This two-stage process can be advantageously combined here with the gradation process from the rear side (introduction of the first cutout 6 and of the second cutout 5).

Figure 5:
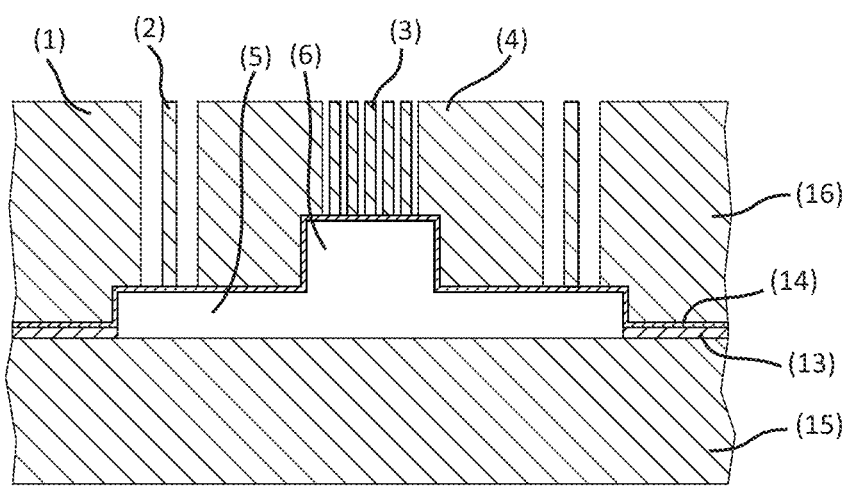
FIG. 5 the component with a base substrate in embodiments with a protective layer, in accordance with embodiments of the subject matter of the disclosure.

FIG. 5 shows a schematic cross-section of a component arranged on a base substrate 15 and having a protective layer arranged at the lower side.

Such a protective layer 14, for example an SiO$_2$ layer optimized in its thickness, can optionally be arranged on the rear side of the blank after the etching of the first cutout 6 and, where present, of the second cutout 5. The protective layer 14 can prevent an overetching in the region of very large gaps. It thus protects the lower side of the blank from an etching attack and additionally prevents an unwanted movement of the structures during the etching. This protective layer 14 can also be selectively (FIG. 6) or completely (FIG. 7) removed again after the etching of the structures.

FIGS. 6 to 9 furthermore show schematic cross-sections of the differently designed MEMS in accordance with this application, in each case with a base substrate 15 and a top substrate 17.

The MEMS structure is hermetically closed and a characteristic inner pressure is set by the base substrate 15 and the top substrate 17.

Figure 6:
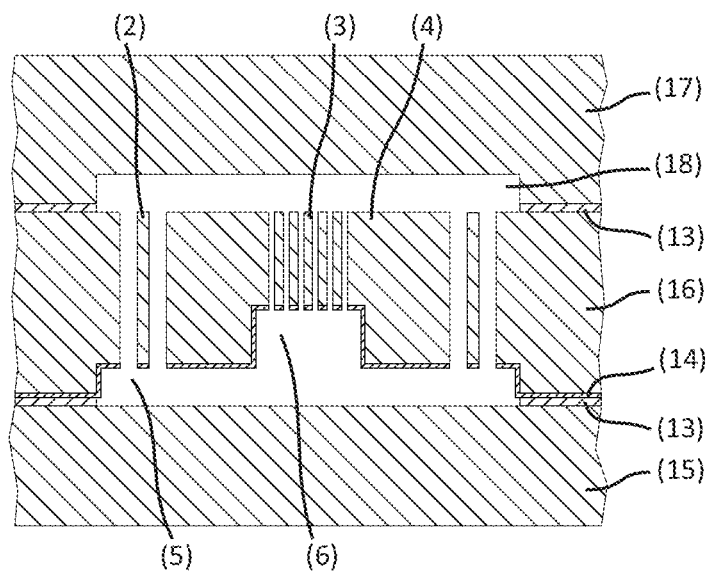
FIG. 6 the component with a base substrate and a top substrate in embodiments with a protective layer, in accordance with embodiments of the subject matter of the disclosure.

FIG. 6 shows, as mentioned, the component 16 of FIG. 5 in a later stage, with the top substrate 17 having been fastened to the component 16 and the protective layer being interrupted at the lower end of the gaps 19, 20 to establish the movability of the structural elements 2, 3. The protective layer 14 has, in contrast, been completely removed in the embodiments of FIG. 7.

Figure 7:
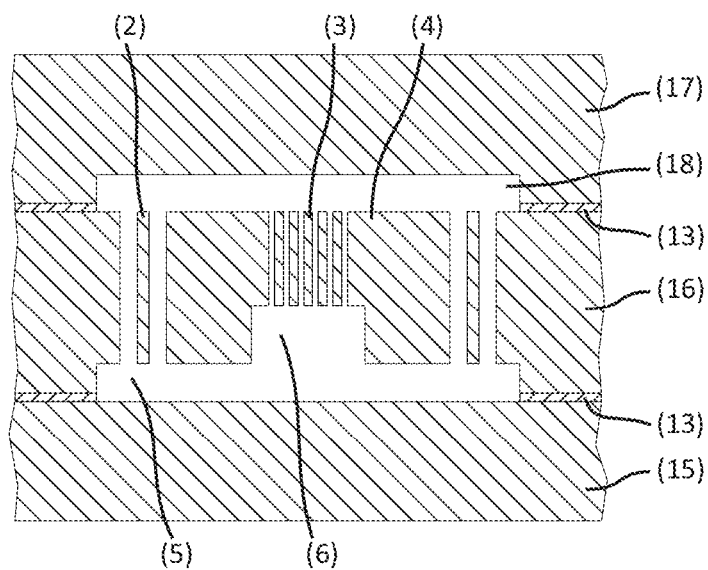
FIG. 7 the component with a base substrate and a top substrate in embodiments without a protective layer, in accordance with embodiments of the subject matter of the disclosure.

The insulation layer 13 is arranged in FIGS. 6 and 7 between the base substrate 15 and the component 16 as well as between the top substrate 17 and the component 16 in each case in the contact regions that represent third regions 23 and have the third thickness (A).

In the embodiments of FIGS. 6 and 7, the contact region is defined toward the base substrate 15 by the third region 23 and the third thickness A itself and is thus provided by the second cutout 5. It is therefore prevented by the second cutout 5 that the mass arrangements 4, the springs 2, or the electrodes 3 have contact with the base substrate 15 and are thereby restricted in their movability. Such a restriction of the movability with respect to the top substrate 17 is prevented by a cutout 18 that is introduced into the top substrate 17 itself. A depth of the cutout 18 can amount, for example, to 2 to 50 µm.

Figure 8:
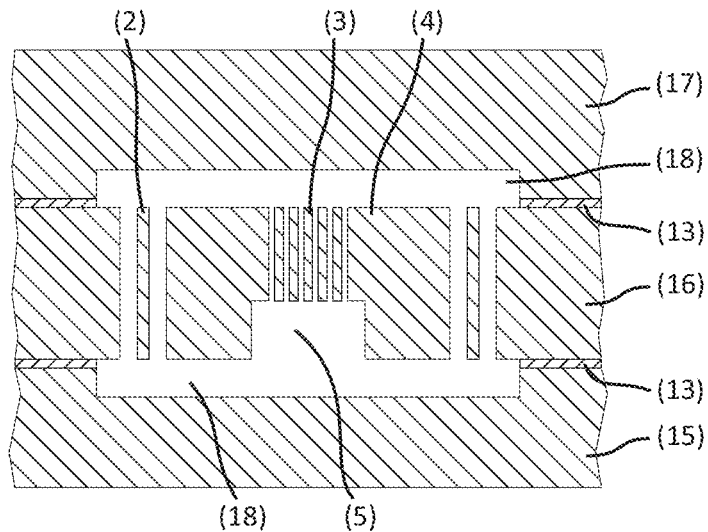
FIG. 8 the component with a base substrate and a top substrate in embodiments with a cavity, in accordance with embodiments of the subject matter of the disclosure.

Embodiments shown in FIG. 8 differ from the embodiments of FIGS. 6, 7 by the lack of the second cutout 5. Only the first cutout 6 is accordingly present at the lower side of the component 16. The described effects of the ARDE can also be used in the production of the component 16. Only the step for introducing the second cutout 6 is omitted. There is accordingly no third region 23 having a third thickness C, but only the first region 21 and the second region 22. The frame 1 and possible anchor structures 27 then have the second thickness B and are connected to the base substrate 15 and/or the top substrate 17 in contact regions that are accordingly likewise located in the second region 22. To maintain the movability with respect to the base substrate 15, the base substrate 15 also has the cavity 18 and thus compensates the lack of the second cutout 5. The cavity 18 in the base substrate can also be 2 to 50 µm in depth. The top substrate 17 has the properties as in the embodiments of FIGS. 6 and 7.

Figure 9:
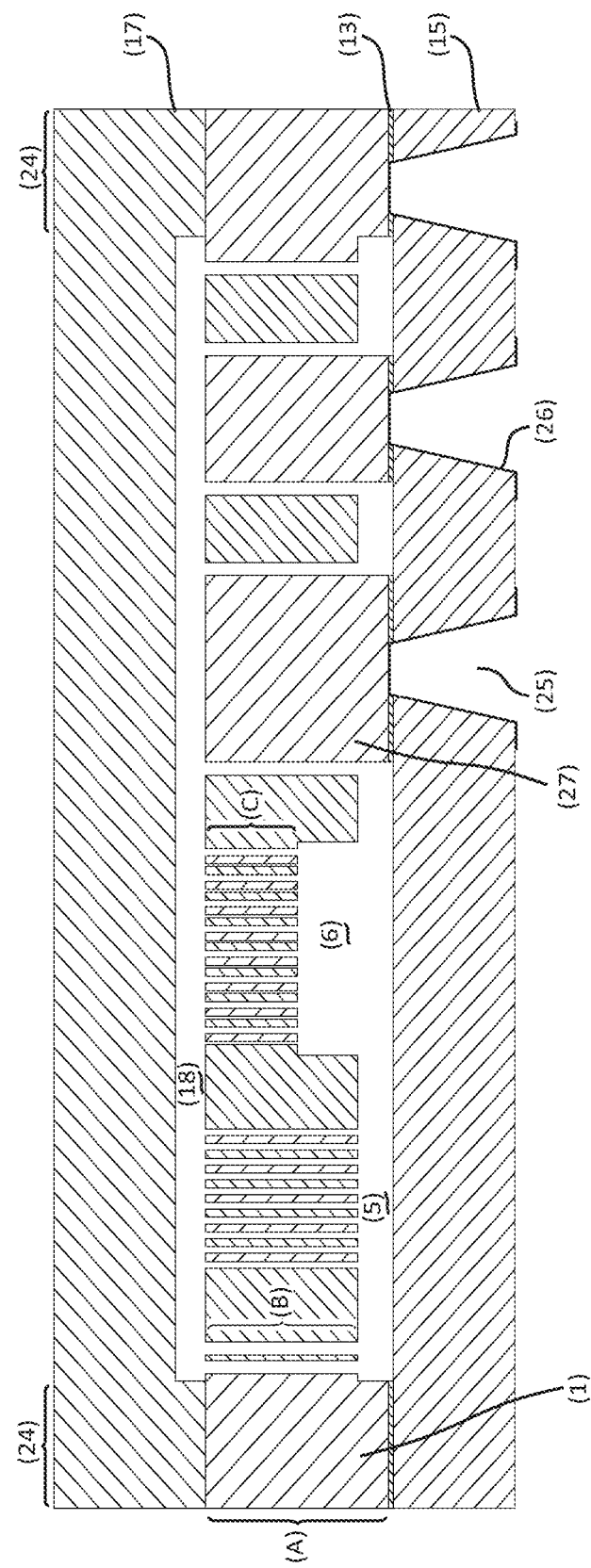
FIG. 9 a further view of the component with a base substrate and a top substrate, in accordance with embodiments of the subject matter of the disclosure.

FIG. 9 shows a schematic cross-section of a larger section of the fully completed MEMS structure.

The component again has the first 6 and the second 5 cutout so that the cavity 18 on the base substrate 15 is dispensed with, whereas the top substrate 17 has the cavity 18. Due to the design of the cavity 18, the fastening regions of the component 16 to the base substrate 15 are not identical to the fastening regions of the component to the top substrate 17: While the base substrate 17 is connected to the frame 1 and to the anchor structures 27, the top substrate is only connected to the frame 1.

The base substrate 15 has contact openings or contact holes 25 that enable the access to the fastened third regions 23 that are here disposed at the anchor structures 27. The contact openings 25 can, however, alternatively or additionally also be disposed in the region of the frame 1 in other embodiments. Alternatively or additionally, contact openings that enable the access to the fastening regions 24 can also be present in the top substrate 17. In the case of the use of an electrically conductive or semiconductive substrate material, the fastening regions and the substrate surface of the base substrate 15 and/or top substrate 17 can be coated, also in the region of the contact openings 25, with the electrically insulating insulation layer 13, for example SiO2. The contact openings 25 and regions of the surface in contrast have an electrically conductive layer, for example a metal layer 26, whereby an electric contact with the structures for example electrodes 3, of the MEMS is established and a rewiring (connection of different MEMS regions separated in the interior with one another and provision of contact surfaces for external connectors) is made possible. The electrodes 3, 7 can thus be contacted and the described capacitance changes of the capacitors formed by the electrodes 3, 7 caused by vibration can be detected and measured.

The method of producing the MEMS element shown, for example, in FIG. 9 on the basis of the expanded cavity SOI technology comprises, for example, the following process steps:
  i. Providing a base substrate (15), optionally with an electrical insulation layer (13);
  ii. providing a blank having a thickness that is larger than the third thickness (A);
  iii. introducing a second cutout (5) into the lower side of the blank, preferably by etching;
  iv. introducing at least one first cutout (6) in a lower side of the blank that is located within the second cutout (5), preferably by etching;
  v. assembling the blank on the base substrate (15), in the fastening regions (23), preferably by wafer bonding;
  vi. thinning the blank starting from the upper side so that the first thickness (C) is adopted in at least one first region (21). the second thickness (B) in the second region (22), and the third thickness (A) in the third region or fastening region (23);
  vii. applying and structuring a mask layer, preferably a lacquer mask or a hard mask, on the upper side of the blank for defining all the lateral dimensions of the micromechanical structure;
  viii. structuring the micromechanical functional layer with the aid of this mask layer starting from the upper side in the vertical direction, preferably by perpendicular anisotropic dry etching, whereby the production of the vertical gaps (19, 20) and the release of the total structure takes place in one step;
  ix. removing the mask layer;
  x. encapsulating the component (16) with a further substrate as a top substrate (17) that has at least one cavity (18) and optionally an electrical insulation layer (13), preferably by wafer bonding; and
  xi. producing the optionally electrically insulated contact openings (25) in the base substrate (15) and/or in the top substrate (17) to the structural elements (2, 3) of the component (16) and applying electrically conductive (metallic) compounds (26).

The application further relates to the following aspects helpful for the understanding of the disclosure:

A first aspect of a micromechanical system having a vibratory spring-mass arrangement, comprising a base substrate and/or a top substrate for fastening a micromechanical structure and of electrode and damper arrangements, comprising at least one mass element (4) and a spring combination (2, 8, 12) that enables a freedom of movement in at least one spatial direction, optionally up to three spatial directions, comprising plate-like elements having straight or curved geometry, coupled to the movable mass and/or to stationary and electrically insulated regions and thereby forming electrode arrangements for electrostatic excitation/force coupling or capacitive detection or for fluidic damping (3, 7, 9, 10, 11), wherein the structure has at least two thinned regions having characteristic cutouts (5), (6) to the substrate and structural thicknesses (B, C) resulting therefrom, and associated minimal gap intervals (20, 19), with the maximum aspect ratio of gap width to structural thickness being approximately equal in both regions.

A second aspect of a micromechanical system in accordance with aspect 1, wherein the micromechanical system comprises monocrystalline Si; and/or the substrate comprises monocrystalline Si or a glass material or ceramic material thermally adapted to the Si.

A third aspect of a micromechanical system in accordance with aspect 1 or 2, wherein the typical structural heights (B) are selected in the range 20 . . . 100 µm and the typical maximum aspect ratio is selected as >20; and minimal gap intervals (19) are achieved in the range of 1 µm and smaller.

A fourth aspect of a micromechanical system in accordance with one of the first to third aspects, wherein the maximum aspect ratio and the overlap lengths of the electrodes are selected such that the total structure can be produced with only one anisotropic dry etching process, with an etching time for releasing the structures being approximately the same in both structural thickness regions.

A fifth aspect of a micromechanical system in accordance with one of the first to fourth aspects, wherein the electrodes are configured both as varied in interval and varied in area.

A sixth aspect of a micromechanical system in accordance with one of the first to fifth aspects, wherein springs, electrodes, and dampers can have further gradations in both structural thickness regions so that the structural thicknesses (D, E) result to be able to produce and detect vertical movements.

A seventh aspect of a method of producing a micromechanical system in accordance with one of the first to fifth aspects, said method comprising at least the following steps: providing a substrate (15), preferably with an electrical insulation layer (13); providing a blank for the component (16); introducing a second cutout (5) into the lower side of the blank, preferably by etching; introducing at least one second cutout (6) in a lower side of the blank that is located within the second first (5), preferably by etching; assembling the blank on the base substrate (15), in the fastening regions (23), preferably by wafer bonding; thinning the blank from the upper side so that a marginal thickness (A) is adopted in the fastening region, a first structural thickness (B) in a first region (22), and a second structural thickness (C) in a second region (21) that is disposed in the interior of the region (22); applying and structuring a mask layer, preferably a lacquer mask or a hard mask, on the upper side of the blank for defining all the lateral dimensions of the micromechanical structure; structuring the micromechanical functional layer with the aid of this mask layer starting from the upper side in the vertical direction, preferably by perpendicular anisotropic dry etching, whereby the production of the vertical gaps (19, 20) and the release of the total structure takes place in one step; removing the mask layer; encapsulating the micromechanical structure with a further substrate (17) that has at least one further cutout (18) and optionally an electrical insulation layer (13), preferably by wafer bonding; and producing optionally electrically insulating access openings in the lower (15) or upper (17) substrate to the functional regions of the sensor structure and applying metallic compounds.

An eighth aspect of a method of producing a micromechanical system in accordance with one of the first to fifth aspects or a method in accordance with the seventh aspect, wherein a protective layer (14) is applied to the lower side of the prestructured blank and/or to the upper side of the blank, the thickness of said protective layer (14) being selected such that a masking effect and thus a protection of the surfaces from an etching attack takes place for a limited etching time.

A ninth aspect of a method of producing a micromechanical system in accordance with one of the first to fifth aspects or a method in accordance with the seventh or eighth aspect, wherein no second cutout (5) is introduced into the lower side of the blank, but rather a cutout (18) into the upper side of the base substrate (15).

A tenth aspect of a method of producing a micromechanical system in accordance with one of the first to sixth aspects or a method in accordance with one of the seventh or eighth aspects, wherein a two-stage mask, preferably consisting of a hard mask and a lacquer mask, is used to define the lateral dimensions; in a first structuring step of the micromechanical functional layer in the vertical direction, first all the gaps are pre-etched by a defined amount; only the upper mask layer is then first removed; the structuring of the micromechanical functional layer is continued, preferably by anisotropic dry etching, with a defined lowering of springs, electrodes, and dampers arising from the upper side and the structural thicknesses (D) and (E) being adopted in these regions; and subsequently the hard mask is removed.

The invention claimed is:

1. A component for a micromechanical system having an upper side and a lower side opposite the upper side, the component comprising:
   several first structural elements that are arranged in a first region of the component and are bounded by at least one first gap;
   at least one second structural element that is arranged in a second region of the component different from the first region and is bounded by at least one second gap;
   wherein the first region is defined by a first cutout in the lower side of the component and a first thickness of the component in the first region is reduced with respect to a second thickness of the component in the second region;
   wherein the at least one first gap extends in the first region from the upper side to the lower side and ends in the first cutout and has a first gap depth defined by the first thickness of the component in the first region;
   wherein the at least one second gap extends in the second region from the upper side to the lower side and ends outside the first cutout and has a second gap depth defined by the second thickness of the component in the second region, the second gap depth larger than the first gap depth of the first gap; and
   wherein a minimal second gap width of the at least one second gap is larger than a minimal first gap width of the at least one first gap; and
   further comprising a frame, a mass arrangement vibratory with respect to the frame, and an anchor structure fixedly arranged or fixedly arrangeable relative to the frame, wherein the at least one first gap extends between the mass arrangement and the frame or between the mass arrangement and the anchor structure such that the several first structural elements bounded by the at least one first gap comprises first electrodes, the first electrodes comprising fixed electrode elements connected to the anchor structure or to the frame, and the first electrodes comprising movable electrode elements connected to the mass arrangement, wherein the fixed electrode elements connected to the anchor structure or to the frame and the movable electrode elements connected to the mass arrangement engage into one another and are movable relative to one another.

2. The component according to claim 1, wherein a maximum first aspect ratio of the at least one first gap is given by a ratio of the first gap depth to the minimal first gap width;

wherein a maximum second aspect ratio of the at least one second gap is given by a ratio of the second gap depth to the minimal second gap width; and wherein the maximum first aspect ratio is equal to or substantially equal to the maximum second aspect ratio.

3. The component according to claim 2, wherein the maximum first aspect ratio of the at least one first gap and the maximum second aspect ratio of the at least one second gap are at least one of each 10:1 or more.

4. The component according to claim 1, wherein the several first structural elements are bounded by the at least one first gap at at least two opposite sides extending at least sectionally in parallel with one another and/or the at least one second structural element is bounded by the at least one second gap at at least two opposite sides extending at least sectionally in parallel with one another such that the several first structural elements or the at least one second structural element is formed as a straight or curved plate.

5. The component according to claim 1, wherein first gaps of different widths are arranged in the first region.

6. A micromechanical system comprising a component according to claim 5, and including a substrate for fastening the component, wherein the frame and/or an anchor structure of the component are connected to the substrate at the upper side and/or at the lower side.

7. The micromechanical system according to claim 6, wherein the substrate is produced from at least one of silicon and a glass material or ceramic material, with the glass material or the ceramic material being thermally adapted to silicon.

8. The component according to claim 1, wherein the at least one second structural element comprises an elastic spring that connects the frame and the mass arrangement to one another such that they can vibrate relative to one another while deforming the spring.

9. The component according to claim 8, wherein the at least one second gap extends between the mass arrangement and the frame or between the mass arrangement and an anchor structure fixedly arranged or fixedly arrangeable relative to the frame such that the at least one second structural element bound by the at least one second gap comprises second electrodes or dampers that comprise electrode elements connected to the frame or to the anchor structure and comprise the electrode elements connected to the mass arrangement, wherein the electrode elements connected to the anchor structure or to the frame and the electrode elements connected to the mass arrangement engage into one another and are movable relative to one another.

10. The component according to claim 1, wherein the minimal first gap width of the at least one first gap amounts to at least one of at least 0.1 µm and at most 3 µm, and the minimal second gap width of the at least one second gap amounts to at least one of at least 1.5 µm and at most 4 µm.

11. The component according to claim 1, wherein the first thickness amounts to at least one of at least 5 µm, at most 100 µm, at least 15% of the second thickness, and at most 90% of the second thickness.

12. The component according to claim 1, wherein a height of one or more of the several first structural elements and/or of one or more of the at least one second structural element is reduced at the upper side and/or at the lower side with respect to the thickness of the respective region in which the several first structural elements are or the at least one second structural element is arranged.

13. The component according to claim 1, wherein the component includes silicon.

14. The component according to claim 1, wherein lateral dimensions of the component, perpendicular to the thickness direction of the component, amount to between 0.5 mm and 15 mm, and/or lateral dimensions of the first cutout amount to between 100 µm and 2000 µm.

15. The component according to claim 1, wherein the second region is defined by a second cutout in the rear side of the component and the second thickness is smaller than a third thickness of a third region different from the first region and the second region, with the frame and/or an anchor structure extending at least partially in the third region.

16. A method of producing the component according to claim 1, said method comprising at least the following steps:
introducing the first cutout into the lower side of a blank for forming the component so that the blank has the first thickness extending in a z direction in the first region defined by the first cutout, the first thickness being smaller than the second thickness extending in the z direction in the second region different from the first region;
etching the at least one first gap in the first region to produce at least one the several first structural elements bounded by the at least one first gap; and
etching the at least one second gap in the second region to produce at the least one second structural element bounded by the at least one second gap;
wherein the etching takes place in each case along the z direction and is carried out such that the at least one first gap has the first gap depth defined by the first thickness that is smaller than the second gap depth of the at least one second gap defined by the second thickness in the second region.

17. The method according to claim 16, wherein the at least one first gap and the at least one second gap are etched in the z direction, starting from the upper side of the blank toward the lower side, the upper side being remote from the lower side.

18. The method according to claim 16, said method further comprising a step in which a mask is applied to the upper side of the blank and geometrical dimensions are predefined by the mask in a plane perpendicular to the z direction for the at least one first gap and the at least one second gap.

19. The method according to claim 16, wherein the at least one first gap and the at least one second gap are etched simultaneously.

20. The method according to claim 16, wherein the blank consists of silicon or comprises silicon and/or wherein the etching is carried out in a dry etching process.

21. The method according to claim 16, wherein the second region is defined by a second cutout, with the second cutout being introduced into the lower side of the blank in a step disposed upstream of the introduction of the first cutout, with the first cutout being introduced into the blank within the second cutout.

22. The method according to claim 16, wherein a protective layer is at least regionally applied to the lower side of the blank in a step disposed downstream of the introduction of the first cutout into the blank or in a step disposed downstream of the introduction of the first cutout and the introduction of the second cutout into the blank.

23. The method according to claim 16, comprising a step in which a height of one or more of the several first structural elements is reduced with respect to the first thickness starting from the upper side and/or starting from the lower side; and/or in which a height of one or more of the at least one second structural element is reduced with respect to the second thickness starting from the upper side and/or starting from the lower side, and in each case in an etching process using a two-stage mask, comprising a hard mask and a lacquer mask.

24. The method according to claim 16, wherein the blank is arranged on a base substrate and is fastened thereto and the first and second gaps are introduced into the blank fastened to the base substrate afterward.

25. The method according to claim 24, wherein the blank having the introduced gaps is covered by a top substrate and contact regions of the blank, including at least one of the frame and the anchor structure, are connected to at least one of the base substrate and the top substrate.

26. The method according to claim 25, wherein an insulation layer is arranged in at least one of the contact regions of the component having at least one of the base substrate and the top substrate; and/or a cavity is introduced into at least one of the base substrate and the top substrate outside the contact regions on a side of the base substrate or of the lower substrate facing the component before the fastening.

* * * * *